3,358,028
CHLOROFLUOROBIS(DIFLUORAMINO) METHANE

Douglas H. Dybvig, Northfield, Minn., assignor to Minnesota Mining and Manufacturing Company, St. Paul, Minn., a corporation of Delaware
No Drawing. Filed Oct. 5, 1964, Ser. No. 404,200
1 Claim. (Cl. 260—583)

This invention relates to a new and useful composition of matter.

The compound of the invention, chlorofluorobis(difluoramino)methane is a useful intermediate for the production of oxidants and in syntheses, for example, it reacts with potassium iodide in moist acetonitrile to produce chlorofluorodiazirine.

In this example parts are by weight unless otherwise indicated.

Chlorofluorobis(difluoramino)methane is prepared by first reacting 90 parts of prefluoroguanidine in 100 parts by volume of reagent grade tetrahydrofuran with 10 parts of anhydrous potassium fluoride at about 20° to 25° C. in a suitable glass vessel (employing the normal precautions for handling such oxidants) for about 60 hours and thereby forming an unisolated intermediate, possibly $FC(NF_2)_2NFH$. To this reaction mixture are added 73 parts of nitryl chloride and reaction proceeds at 20° to 25° C. for a further 24 hours. The reaction mixture is worked up by fractional distillation. The fraction boiling at −23° C. at pressures above 2 mm. of Hg. is collected in a liquid air trap (−196° C.) and further purified by vapor phase chromatography on a mixture of 67 percent of 30 to 60 mesh acid washed diatomaceous earth and 33 percent of chlorotrifluoroethylene pentamer using helium as a carrier gas at a rate of 150 ml. per minute. Chlorofluorobis(difluoramino)methane which boils at about 0° C. at atmospheric pressure is collected having a relative retention itme (referred to $CFCl_3$) of 54.6.

It is characterized by infrared absorption in regions corresponding to C–Cl, C–F and N–F bonds (at 8.3, 9.0, 9.4, 10.0, 10.4, 10.8 and 11.0 microns) and $F^{19}$ nuclear magnetic resonance absorptions at $-30.9\phi$ (N–F) and $+101.9\phi$ (C–F). The mass spectrum shows the fragments $(F_2N)_2CF$—, $ClFC(NF_2)NF$— and numerous smaller fragments.

What is claimed is:
The compound chlorofluorobis(difluoramino)methane.

References Cited

Hoffman et al.: Chem. Reviews, vol. 62, p. 15 (1962).

CHARLES B. PARKER, *Primary Examiner.*

CARL D. QUARFORTH, *Examiner.*

L. A. SEBASTIAN, *Assistant Examiner.*